United States Patent [19]

Conner et al.

[11] 4,311,494
[45] Jan. 19, 1982

[54] AXIAL FLOW GAS CLEANING DEVICE

[75] Inventors: Wayne L. Conner, Warren; William G. Martin, Bloomfield Hills, both of Mich.

[73] Assignee: Facet Enterprises, Inc., Tulsa, Okla.

[21] Appl. No.: 99,359

[22] Filed: Dec. 3, 1979

Related U.S. Application Data

[63] Continuation of Ser. No. 831,712, Sep. 26, 1977, abandoned, which is a continuation-in-part of Ser. No. 640,136, Dec. 12, 1975, abandoned.

[51] Int. Cl.³ .............................................. B01D 45/16
[52] U.S. Cl. ........................................ 55/394; 55/457
[58] Field of Search ................. 55/306, 394, 396, 456, 55/457, 461, 463

[56] References Cited

U.S. PATENT DOCUMENTS

| | | | |
|---|---|---|---|
| 3,591,011 | 7/1971 | Holter et al. | 55/396 X |
| 3,616,619 | 11/1971 | Klein | 55/457 X |
| 3,713,280 | 1/1973 | Keller et al. | 55/457 X |
| 3,895,930 | 7/1975 | Campolong | 55/457 X |

Primary Examiner—Robert H. Spitzer
Attorney, Agent, or Firm—Remy J. VanOphem

[57] ABSTRACT

The invention is a device which provides for separation of contaminants from a relatively high velocity stream of gas. The invention provides a first stage wherein the gas stream is decelerated and the contaminant particles are caused to separate from the air stream by interacting with a first surface. The interaction results in the particles to acquire a radial velocity vector and by virtue of the momentum of the contaminants particles. The contaminant particles are forced to the outer layer of the gas stream. The second stage of separation provides for further magnification of the radial velocity vector and also induces a slight tangential velocity component to the contaminant particle. By impacting the contaminants against a vane mounted within the gas stream, the contaminant particles, as a result of this impact, acquire a slight swirl or circular motion which causes the contaminant particles to be more localized. In the next stage of the cleaning device, the gas stream is rapidly accelerated by decreasing the area through which the gas stream must travel. This increase in velocity of the gas stream increases the separation for the smaller contaminant particles until a final separation stage is attained. In this final stage, the velocity of the gas stream is decreased maintaining flow separation between the contaminants and the gas stream. The contaminant particles continue along the periphery of the cleaning device into a discharge channel, while relatively clean gas exits axially from the device, and exits the cleaning device.

2 Claims, 3 Drawing Figures

AXIAL FLOW GAS CLEANING DEVICE

This application is a continuation of application Ser. No. 831,712, filed Sept. 26, 1977, which in turn is a continuation-in-part of application Ser. No. 640,136, filed Dec. 12, 1975, both now abandoned.

BACKGROUND OF THE INVENTION

1. Field of the Invention

The invention relates to a means for separating particle contaminants from a relatively high velocity axially flowing stream of gas such as may be required for internal combustion engines, diesel engines, jet aircraft engines, turbines, or the like, and which requires a clean supply of air or other gas.

2. Description of the Prior Art

Centrifugal force has been employed to separate solid contaminant particles from an axially flowing gas stream. Prior art devices have required that the centrifugal force be relatively high to accomplish the desired purposes. The resulting abrasive effect of the contaminant particles reduces the life of the device significantly. Therefore, the method of inducing centrifugal action has varied among centrifugal force generators. For example, Monson, U.S. Pat. No. 3,517,821, teaches a centrifugal separator with a deflecting element which has a centrally located axially extending hub with a plurality of generally helical type vanes extending radially outwardly, each vane having a chamber in the high pressure surface thereof. The object of the improved deflecting element being to improve the efficiency of the centrifugal separator. Also, in Campolong, U.S. Pat. No. 3,895,930, a vaned deflector disposed within the centrifugal separator causes the influent air stream to impart a helically spinning or cyclonic movement to the air stream. The air entrained dirt particles that are relatively heavy are thrown to the periphery of the tube due to the centrifugal force of the vortex stream, thus cleaning the air of the contaminant particles at the center of the tube.

Both of these centrifugal separators, as a result of the design of the generator, do obtain total separation of the contaminant particles from the gas stream, but as pointed out above, the life of the device is short because of the abrasion of the contaminant particles on the inner surface of the tube housing the generators, as well as the outer surfaces of the deflecting element.

SUMMARY OF THE INVENTION

This invention contemplates a device having a substantially hollow casing for receiving a relatively high velocity axially flowing stream of gas at an inlet end thereof and gas stream having particles dispersed therein. A geometrically optimized divergent section of a generator member is coaxially disposed with the casing to separate the contaminant particles from the air stream and to direct and maintain these particles against the casing wall, while the relatively clean gas is discharged through an opposite outlet end of the casing and the contaminant particles are discharged through a passage communicating with the casing wall near the opposite outlet end.

The generator member surface is geometrically optimized to effect the velocity and momentum of the contaminant particles, thereby causing the particles to direct themselves toward the casing wall in the first stage of separation. This is accomplished in a first phase by imposing on the axial velocity of the contaminant particles a radial velocity component as a result of either impinging the particles upon the divergent section of the generator member located in a divergent section of the housing adjacent the inlet and in the first stage portion of the separator, or by impinging the particles upon other particles which have already been directed towards the outer wall of the separator casing. By virtue of the momentum of the heavier particles, the contaminants tend to be concentrated in the outer region of the gas stream as the flow of gas approaches the second phase of the separator. The second phase of the separator consists of a plurality of blades circumferentially mounted on the generator member which cause the particle to undergo a momentum exchange upon impact with these blades. The impact with the blades greatly magnifies the radial velocity component and also induces a slight tangential component to the velocity of the particle flow, thereby creating a momentum exchange causing the heavier particles to move further out towards the separator casing and localizing the heavier contaminant particles to the outermost portion of the inside surface of the separator casing. As the gas stream exits the second phase of the generator member, the radial velocity of the contaminant particles vector is substantially larger than the axial velocity vector as a result of the effects of the blades mounted in the gas stream. The gas particles also experience an increase in the radial velocity vector, but because of the substantial difference in mass between the gas particles and the contaminant particles, the effect of this induced momentum is relatively insignificant and separation is obtained between the contaminant particles and the gas particles. The third stage of separation is, again, a geometrically optimized design of a divergent surface the generator member surface to increase the velocity of the gas stream to again separate the lighter contaminant particles from the gas stream in a manner similar to that in phase one. The lighter particles accelerate as a result of a decrease of cross sectional area through which the gas flows and acquire a radial velocity component by impinging upon the geometrically optimized design surface of the generator. This increase in radial velocity results in additional separation of the lighter particles from the stream of gas that flows across the third stage of the generator. As in the first stage of separation, these lighter particles are directed towards the inner casing of the separator and the mass momentum of the particles carries the contaminant particles to the outer wall of the separator. The final phase of separation is obtained by rapid contraction of the gas stream without imparting flow separation with the contaminant particles. This, again, is acquired as a result of a geometrically optimized design of the generator member which provides for the clean air to rapidly contract and be discharged through an opposite outlet end of the casing without inducing flow separation. The contaminant particles are discharged through a passage communicating with the casing wall near the opposite outlet end.

The main object of this invention is to provide a device to separate solid contaminant particles from a relatively high velocity axially flowing stream of gas.

Another object of this invention is to separate contaminant particles from a flowing stream of gas by effecting the momentum of the contaminant particles without inducing flow separation, rather than through centrifugal force as required by prior art devices.

A further object of this invention is to provide a means to separate contaminant particles from a flowing stream of gas by inducing a tangential as well as radial velocity vector to the axial inlet velocity of the contaminant particle through the use of a geometrically optimized separator generator.

Still a further object of this invention is to accomplish the aforenoted contaminant particle separation with a high efficiency and low pressure drop in the axially flowing gas.

Still another object of this invention is to accomplish the above separation by optimizing the geometrical relationship between the components of the device.

The foregoing and other objects and advantages of this invention will appear more fully from the detailed description which follows, taken together with the accompanying drawings wherein one embodiment of the invention is illustrated by way of example. It is to be expressly understood, however, that the drawing is for illustration purposes only, and is not to be construed as defining the limits of the invention.

DETAILED DESCRIPTION OF THE PREFERRED EMBODIMENT

Figure 1:
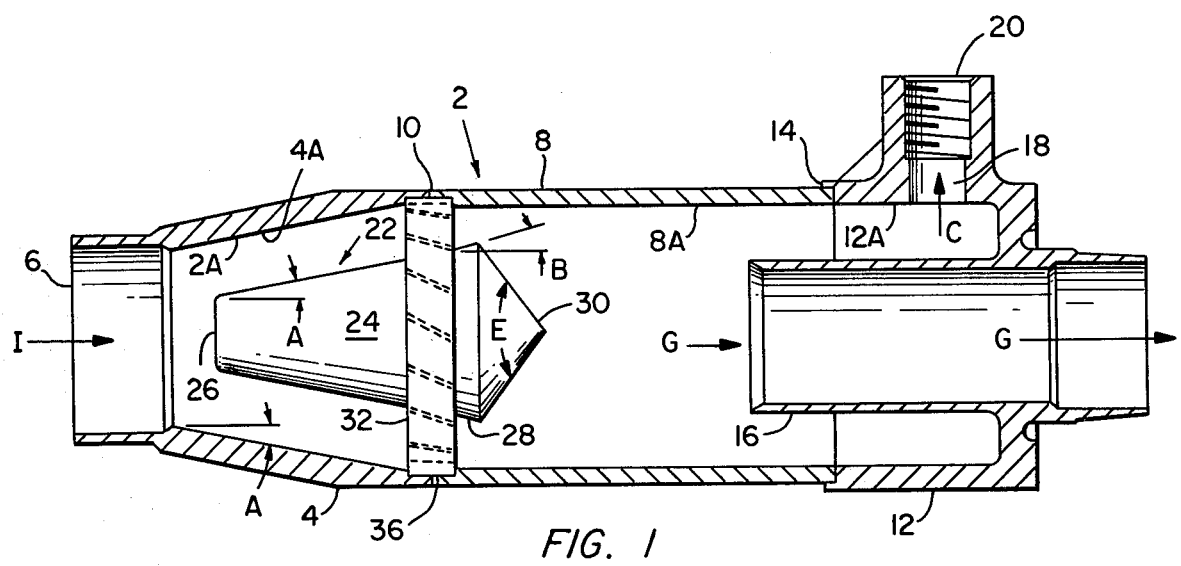
FIG. 1 is a cross-section side view showing the structural components of the invention and the geometric relationships therebetween.

With reference to FIG. 1, the separator device includes a tubular housing designated generally by reference character 2. The tubular housing 2 includes a divergent section 4 adjacent an inlet end or neck 6 for receiving a relatively high velocity axially flowing stream of gas I. The smaller inside diameter side of divergent housing section 4 is adjacent the inlet 6. The tubular housing 2 further includes an annular central section 8 and an annular cap or outlet section 12. The central section 8 of constant inside diameter is suitably secured at one end 10 to inlet section 4 and at the opposite end 14 to the annular cap or outlet section 12.

The outlet section 12 has an annular axially disposed channel 16 through which relatively clean gas G flows external to the device and further includes an annular normally disposed channel 18 communicating with the wall 12A of the outlet section 12 through which the contaminant particles C flow external to the device in a manner and for the reasons to be hereinafter explained. The channel 18 includes a choke nozzle 20 for controlling the flow as is well known in the art.

A generator member 22 generally shaped as a surface of revolution is axially disposed within the inlet section 4 and a portion of the central section 8 adjacent the inlet section 4. The generator member 22 includes a divergent surface section 24 which is geometrically optimized from one diameter at its forward end 26 adjacent the inlet to another larger diameter at its rearward end 28 to control the velocity and the momentum of the contaminant particles passing over the generator separator. As shown, the divergent surface section is disposed within the divergent housing section 4 and its larger diameter is substantially the same diameter as the inlet 6. Likewise, the rearward end 30 of the generator member 22 has a second divergent surface which is geometrically optimized to control the velocity of the gas passing through the separator prior to exit from the casing through channel 16.

Attached to the generator body 24 at a pre-determined location between diameters 26 and 28 is an annular rim 32. The arrangement is such that the rim 32 is suitably secured in a groove 36 carried in the adjacent ends of the divergent housing section 4 and the central casing section 8. To this extent, the generator member 22 and the rim 32 may be a unitary casting or a machined component, or may be separate components suitably secured each to the other as will be understood by those skilled in the art. Likewise, although the inlet casing section 4, the central casing section 8, and the outlet casing section 12 have been illustrated as separate components, the casing 2 may be a single casting or a machined component or several components as may best be suited for manufacturing purposes, the same not being a significant feature of the invention being described.

Figure 2:
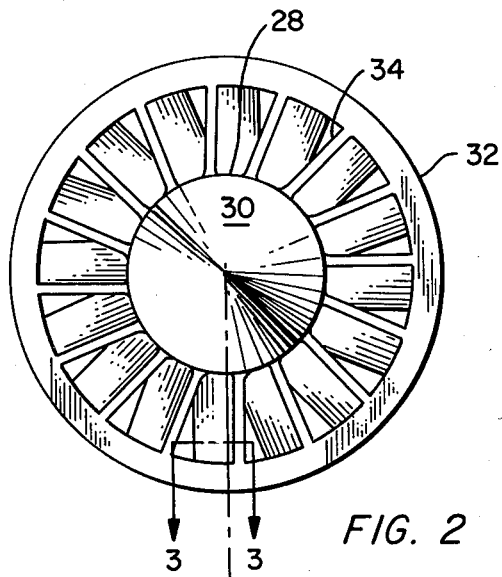
FIG. 2 is a right end view, relative to FIG. 1, showing the generator member arranged in accordance with the invention.
Figure 3:
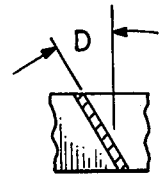
FIG. 3 is a sectional view taken along lines 3—3 of FIG. 2 showing a pre-determined angular relationship between the veins and the axis of the generator member.

With reference, now, to FIG. 2, there is shown the construction details of the annular rim 32 mentioned above. The annular rim 32 has a plurality of vanes 34 arranged therewith and equidistantly disposed circumferentially around the generator body 24. As shown in FIG. 3, the vanes 34 are disposed at an angle D relative to the axis of the rim 32 and the generator body 24. The angle D is geometrically optimized to obtain the desired tangential velocity changes in the contaminant particle flow in order to maximize the separation of the contaminant particles with the flowing stream of gas, as will become evident from the description of the operation of the device which follows.

It is to be understood that the described components of the invention may be constructed from any suitable metallic or non-metallic material and, which material is dependent upon the medium for which the device is intended, i.e., whether the gas involved is corrosive or non-corrosive, as well as the temperature and pressure of the system wherein the invention it utilized.

OPERATION OF THE INVENTION

For purposes of explanation, the separation of contaminant particles from the gas stream occurs during four distinct phases that will be described as the gas enters, passes through and leaves the separator casing. In the first phase the contaminant particles acquire a radial velocity vector to the axial inlet velocity. This begins to separate the contaminant particles from the gas particles. The second phase provides for the contaminant particles to acquire a small tangential velocity component, and also provides for greatly magnifying the radial velocity component acquired during the first phase. The third phase, as in the first phase, provides for the lighter contaminant particles to acquire a radial velocity vector to the axial velocity vector and be separated from the gas without inducing flow separation of the heavier contaminant particles. The final, or fourth, phase permits the clean gas to be completely separated from the contaminant particles and exited through the outlet channel 16.

In operation, a relatively high velocity stream of contaminated gas I enters the tubular housing 2 and through the divergent housing section 4, as indicated by the arrows in FIG. 1. In this first phase of separation, the gas stream is rapidly decelerated causing the heavier contaminant particles to impinge upon the generator body member 24 and, as a result of the momentum of these heavier particles, the impingment redirects the particles towards the outer wall 4A of the inlet section. Further, the lighter particles may impinge with either the generator body 24 or other redirected heavier particles in order to also, as a result of their momentum be redirected towards the outer wall casing 4A. The impingment of these particles with the geometrically optimized surface of generator body 24 results in the particles acquiring a radial velocity component which is transverse or normal to their original axial inlet velocity upon entering the separator device.

As the incoming gas passes from the first phase into the second phase of separation, it passes through the vanes 34 whereby a momentum exchange occurs. The contaminant particles are impacted upon the blades and, as a result, the radial velocity component is greatly magnified due to the geometric configuration of the blades and their relationship to the flow of gas through the separator. Further, a slight tangential velocity component is induced to the particle flow thereby creating a momentum exchange causing the heavier particles to move further out towards the central section wall 8A and causing the contaminant particles to further localize themselves against the central section inner wall 8A. The tangential velocity component causes the contaminant particle to adapt a slight circular motion as they pass along the inner wall 8A of the central section 8 without inducing flow separation.

Upon exit of phase two, the gas again slightly decelerates because of the increased cross sectional area that it must pass through upon exiting the vanes. At this point, further separation is experienced as a result of the impingment with the divergent surface between the vanes and the rear diameter 28 of the generator. As in phase one, the surface of this area is geometrically optimized so that the lighter contaminant particles are accelerated to impinge upon the surface and acquire a radial velocity component to their axial velocity so that the lighter particles travel towards the central section 8 inner wall 8A to cause further concentration of the contaminant particles in the outermost region of the gas stream.

The final phase of the axial gas flow separator is defined by the area of the generator body 24 lying rearward of the diameter 28 and the end of the generator body.

Again, this portion of the generator body is geometrically optimized to provide for the gas stream to rapidly contract and decelerate without inducing flow separation. The contaminant particles maintaining the higher velocity and having been directed towards wall 8A retain their direction while the relatively clean gas stream, having been contracted through the geometrical effect of the generator body portion 30, is directed towards the channel 16 and exits therethrough as shown in FIG. 1. The contaminant particles C now near the wall 8A, exit through a channel 18, choked by the choke nozzle 20, as shown by the arrow in FIG. 1.

It can now be seen from the aforegoing description of the invention that the separation of contaminant particles from the incoming stream of gas is achieved with a high efficiency and low pressure drop by optimizing the geometric relationship of the separator components of the invention. Thus, of significant importance is inducing the separation of the contaminant particles from the gas flow are angles A and B of the generator body 24 of the generator member 22. Similarly, angle E of the generator body portion 30 is significant for providing a rapid contraction of the gas stream and directing the clean air through the channel 16, as noted. Likewise, the vane angle D, shown in FIG. 3, is optimized to provide the proper tangential velocity component to the contaminant particles so as to eliminate the effect of prior art devices wherein centrifugal force has been generated and has caused undesirable abrasive effects upon the generator. Also, the relations between the casing and the generator diameters are optimized to decelerate and accelerate the gas flow to assure momentum control of the contaminant particles.

Although but a single embodiment of the invention has been illustrated and described in detail, it is to be expressly understood that the invention is not limited thereto. Various changes may also be made in the design and arrangement of the component parts without departing from the spirit and scope of the invention as the same will now be understood by those skilled in the art.

What is claimed is:

1. A separator device for concentrating particles dispersed in a flowing gas stream comprising:
   a tubular housing have an inlet section at one end and an outlet section at the opposite end, said inlet section receiving said flowing gas stream therethrough;
   said tubular housing having an intermediate diverging section having a relatively small inside diameter end immediately adjacent to said inlet section and a relatively large inside diameter end remote from said inlet section; and
   a generator body disposed within said tubular housing and mounted in a generally centrally located position therein, said generator body further comprising:
   a first diverging section disposed in said intermediate diverging section, said first diverging section having a relatively small diameter end disposed adjacent said inlet section and a relatively large diameter section disposed adjacent to said larger inside diameter end of said intermediate diverging section of said tubular housing;
   a plurality of radially extending vanes disposed circumferentially spaced about the periphery of said generator body at a point immediately downstream of said first diverging section, said plurality of radially extending vanes extending transversely to the direction of gas flow therethrough, said plurality of radially extending vanes having one end adjacent the periphery of said generator body and an opposite end attached to said large inside diameter end of said intermediate diverging section;
   a second diverging section mounted downstream of said plurality of extending vanes, said second diverging section having a relatively larger diametrical end section than said relatively large diameter section of said first diverging section; and
   a rearward section mounted downstream of said relatively larger diametrical end section of said second diverging section to reduce the velocity of the flowing gas stream;
   whereby said flowing gas stream having particles dispersed therein is introduced through said inlet section of said tubular housing so as to flow into said first diverging section of said generator body and into said intermediate diverging section of said tubular housing with said particles dispersed in said flowing gas stream acting on said first diverging section of said generator body and being imparted with a radial momentum vector, said radial momentum vector further moving said particles in the outermost region of said flowing gas stream through said first and intermediate diverging sections to concentrate said particles in the outermost region, whereby a tangential velocity component is imposed on said particles and said radial momentum vector is further enhanced when said particles in said flowing gas stream pass through said plurality of radially extending vanes and said particles are further acted on by said plurality of vanes such that said particles are further concentrated in the outermost of said flowing gas stream in said housing, whereby said flowing gas stream further flowing past said second diverging section with said particles dispersed in said flowing gas stream further being acted on by said second diverging section of said generator body and said radial momentum vector is still further enhanced to further concentrate said particles in the most outer region of said flowing gas stream and whereby said flowing gas stream is further made to flow past said rearward section to reduce the velocity of said flowing gas stream immediately downstream thereof without inducing flow separation.

2. The separator device according to claim 1 further including an axial external channel communicating with said outlet section of said tubular housing and being reduced in diameter from said tubular housing diameter at said downstream section, said axial external channel being disposed downstream of said second divergent section of said generator body; and further including an outlet located radially outward from said axial external channel communicating with the outermost region of said tubular housing interior diameter, whereby relatively clean gas exits through said axial external centrally located channel and the relative portion of the gas flow containing a concentration of said particles passes out through said outlet.

* * * * *

UNITED STATES PATENT AND TRADEMARK OFFICE
CERTIFICATE OF CORRECTION

PATENT NO. : 4,311,494
DATED : January 19, 1982
INVENTOR(S) : Wayne L. Conner

It is certified that error appears in the above-identified patent and that said Letters Patent is hereby corrected as shown below:

Column 1, line 54, after "and" insert - - - the - - -.

Column 5, line 66, delete "is" and insert - - - in - - -.

Signed and Sealed this

Fifteenth Day of November 1983

[SEAL]

Attest:

GERALD J. MOSSINGHOFF

Attesting Officer     Commissioner of Patents and Trademarks